Patented Feb. 3, 1948

2,435,411

UNITED STATES PATENT OFFICE 2,435,411

DIOLEFINE POLYMER RESINS

Frank J. Soday, Swarthmore, Pa., assignor to The United Gas Improvement Company, a corporation of Pennsylvania No Drawing. Application July 7, 1942, Serial No. 450,084

2 Claims. (Cl. 260—93)

This invention is concerned with the utilization of hydrocarbon resins.

More particularly, this invention is concerned with the provision of new compositions of matter comprising a resin or mixture of resins, or a resinous copolymer, derived from one or more unsaturated hydrocarbons and one or more agents designed to prevent or retard the decomposition of such resinous materials.

An object of the present invention is the provision of a coating, impregnating, and/or sealing composition comprising a hydrocarbon resin and an inhibitor, either with or without the addition of one or more agents selected from a list comprising solvents, dyes, fillers, extenders, plasticizing agents, emulsifying agents, wetting agents, waxes, rubber, elastomers in general, natural resins, and synthetic resins other than hydrocarbon resins. Another object of the invention is the provision of an emulsion or a solution of a hydrocarbon resin containing one or more inhibitors, said emulsion or solution being adapted to coat and/or impregnate organic or inorganic fibers, as well as fabrics and finished objects or articles prepared therefrom. Other objects and advantages of the invention will be apparent to those skilled in the art from an inspection of the specification and the claims.

Resins derived from unsaturated hydrocarbons, or from fractions or solutions containing one or more unsaturated hydrocarbons, form a desirable class of resinous materials due to certain particularly valuable properties possessed by such resins, among which may be listed their excellent water resistance, their outstanding dielectric properties, and their resistance to chemical attack.

The polymerization of one or more non-cyclic diolefines, either alone or in admixture with one or more olefines, leads to the production of resinous polymers possessing a number of outstanding properties. Among these unique characteristics are the pronounced adhesive properties of the resins, and their possession of certain elastic characteristics. This latter property is manifested by the unusual flexibility of such resins as shown by their ability to resist severe distortion and mechanical abrasion and stresses when used as a coating material in certain applications.

Other desirable properties of these resins are their comparatively light colors, and the ease with which their softening points may be varied by suitable changes in the polymerizing process employed.

These resinous polymers differ from synthetic rubber in that they possess a definite and reproducible softening point, and are compatible with drying oils. In addition, they do not lend themselves to vulcanization readily by any of the methods usually employed for this purpose in the rubber industry.

Examples of non-cyclic diolefines which may be used for the production of resins of the type described herein are the non-cyclic diolefines containing five, or less, carbon atoms, such as butadiene and, more particularly isoprene and piperylene.

An important commercial source of such diolefines at the present time is the light oil obtained by the pyrolysis of petroleum, or of certain petroleum hydrocarbons. In particular, the light oil obtained in the manufacture of oil gas or carburetted water gas is an especially desirable and abundant source of such non-cyclic diolefines.

While pure or substantially pure non-cyclic diolefines, or mixtures thereof, may be used for the production of resins of the type described herein, I prefer to employ light oil fractions containing one or more of such diolefines.

Any cyclopentadiene or substituted cyclopentadienes present in such fractions preferably is removed prior to polymerization by any method known in the art, such as by the application of elevated temperatures and pressures, followed by distillation to remove the dicyclopentadiene and/or polycyclopentadienes formed.

Examples of non-cyclic diolefine fractions which may be employed are butadiene fractions, isoprene fractions, and piperylene fractions. Mixtures of such fractions also may be employed, such as a fraction or mixture of fractions containing isoprene and piperlyene. Isoprene and piperylene fractions boiling between 25 and 50° C. and containing less than 5%, and more preferably less than 2% cyclopentadiene, are particularly desirable.

Such light oil fractions invariably contain olefines. Thus, a typical light oil butadiene fraction will contain substantial quantities of the isomeric butylenes, while corresponding isoprene and piperylene fractions will contain substantial quantities of isomeric amylenes.

A typical light oil butadiene fraction may contain 50% butadiene, 45–48% butylenes, and 2–5% butanes, while a typical isoprene and/or piperylene fraction may contain 50–80% dienes, 20–48% amylenes, and 2–5% pentanes.

These olefines also enter into the reaction to a degree dependent upon the drasticity of the polymerizing conditions employed. Under the usual operating conditions, a considerable portion or all, of the olefines present are incorporated in the resinous polymers obtained.

Although light oil diolefine fractions containing any desired concentration of non-cyclic diolefines may be used, the use of fractions containing from 40% to 90% non-cyclic diolefines gives especially good results. The exact concentration and ratio of the non-cyclic diolefines and olefines present in a given fraction controls, in large measure, the characteristics of the resinous polymer obtained. Other things being equal, an increase in the ratio of the diolefine present results in the production of a resin having a higher melting point.

The polymerization preferably is carried out in the presence of an aliphatic, aromatic, or other solvent. In case an aromatic solvent is employed, an appreciable quantity of such solvent may be incorporated in the resin obtained.

Thus, the resinous polymers obtained upon the polymerization of one or more light oil non-cyclic diolefine fractions in the presence of an aromatic solvent may contain chemically combined olefines and/or aromatic hydrocarbons in addition to non-cyclic diolefines.

While a number of catalysts may be employed for the conversion of one or more non-cyclic diolefines, or fractions containing such non-cyclic diolefines, to resinous polymers of the type described herein, I prefer to employ acid-acting metallic halides which term as used herein includes acid-acting metallic halide-organic solvent complexes. Excellent results are secured by the use of gaseous boron trifluoride for the polymerization of non-cyclic diolefines.

The temperature employed in the reaction also has a considerable effect upon the characteristics of the resinous polymer obtained. In general, a reduction of the polymerizing temperature results in an increase in the melting point of the resin obtained.

The polymerization preferably is carried out at temperatures below 30° C. and, more particularly, below 10° C. Excellent results are secured when polymerizing temperatures below 0° C. are employed.

In general, the following may be said to be reasonably preferred limits for the reaction variables incident to the polymerization of one or more non-cyclic diolefines: (1) total concentration of unsaturated hydrocarbons in the fraction or fractions employed: 30% to 80% by weight, (2) quantity of acid-acting metallic halide catalyst such as boron trifluoride: 0.1% to 5.0% by weight of the total unsaturated and/or reactive compounds present, (3) temperature: −70 to 30° C., (4) proportion of non-cyclic diolefines present in terms of the total unsaturated aliphatic compounds (olefines and diolefines): from 40% to 98% by weight, and (5) reaction time, up to 48 hours.

After polymerization, the catalyst preferably is neutralized and/or removed, such as by the addition of an aqueous alkaline solution to the polymerized material, followed by filtration. The resinous material then may be isolated by any desired method, such as by distillation assisted by steam, which may be superheated, under reduced pressure.

As pointed out previously, the resinous products obtained by the polymerization of one or more non-cyclic diolefines, such as for example, butadiene, isoprene, and/or piperylene, or of light oil fractions containing one or more non-cyclic diolefines as well as olefines, is well adapted to coat and/or impregnate a variety of surfaces or materials, such as for example organic material.

The term "organic material" as employed herein includes various materials of the character of wood pulp, paper, cardboard, textile fibers, both natural and synthetic, fabricated textile products made therefrom, leather, artificial leather, rubber, artificial rubber, molded, cast, machined, or extruded plastic products, straw plait, and the like. Usually such materials will be somewhat absorbent, and whether the particular product is coated or impregnated, or both, with the resinous material will depend on the conditions of treatment and the nature of the organic material treated.

When the term "organic fiber" is used herein without qualification, it includes the fabricated product as well as the individual fibers, and the term "fabricated product" includes products made by weaving, knitting, felting, or otherwise, forming, fabricating, or manipulating the organic fibers to form an article or product. Paper, for example, is a fabricated product since it is prepared by felting the paper-making fibers.

Resinous materials of the type described herein may be applied to any desired surface by any suitable method. Thus, such resinous materials may be applied in a molten or semi-molten state, such as by the "hot melt" method of coating and/or impregnating paper; the resinous polymers may be dissolved in a suitable solvent or mixture of solvents, such as those of the hydrocarbon type, after which the resinous solution may be applied to the surface to be treated by any desired method; or the resinous polymer, either in the presence or absence of a minor quantity of a solvent and/or a plasticizing agent, may be emulsified, after which the aqueous resinous emulsion may be applied to the surface to be coated. Reference is made to my copending applications Serial Nos. 352,120, filed August 10, 1940; 379,708, filed February 19, 1941; 450,909, filed July 14, 1942; and 481,295, filed March 31, 1943, all of which are now abandoned, which pertain to the preparation of such emulsions.

Resinous materials of the type described herein are well adapted to coat and/or impregnate textile fibers, threads, and fabrics, as well as paper, cardboard, and other fibrous products. In general, such materials are coated and/or impregnated to improve their hand, water resistance, and general appearance, as well as their resistance to shrinkage, creasing, and crushing. Reference is made to my copending applications Serial Numbers 352,121, filed August 10, 1940, now abandoned; 379,710, filed February 19, 1941, now abandoned; 384,021, filed March 18, 1941, now abandoned; 455,717, filed August 22, 1942, now abandoned; 481,742, filed April 3, 1943, now Patent No. 2,416,232, which pertain to such products.

One or more ingredients selected from a list comprising (1) waxes such as paraffin, spermaceti, lanolin, montan wax, ceresin, and beeswax, (2) plasticizing agents such as esters of high-boiling acids, for example esters of phthalic and phosphoric acids, and relatively high boiling aromatic and/or naphthenic oils; (3) other synthetic resins, such as resins prepared by the polymerization of other unsaturated hydrocarbons, vinyl chloride, vinyl acetate, acrylic acid and derivatives of acrylic acid, methacrylic acid and derivatives of methacrylic acid, vinylidene compounds, unsaturated aldehydes, and unsaturated ketones, as well as resins derived by the copolymerization of mixtures containing one or more of the foregoing, (4) derivatives of the foregoing resins, such as the sodium salt of polymerized acrylic or methacrylic acids, (5) rubber, both natural and synthetic; as well as derivatives thereof such as chlorinated rubber, (6) natural resins such as rosin, shellac, congo, dammar, Kauri, elemi, pontiniak, and chicle, (7) pigments, (8) fillers, (9) coloring agents, such as dyes, lakes, and the like, (10) asphalt, both natural and artificial, pitches, gilsonite, and the like, (11) solvents, particularly hydrocarbon solvents, (12) cellulosic plastics such as cellulose nitrate and acetate, and the cellulose ethers, (13) gums, such as gum arabic and gum tragacanth, and (14) miscellaneous materials, such as gelatine, glue, casein, and the like, also may be added to resinous materials of the type described herein prior to, during, or after the application of the said resinous material to a surface or material to be coated and/or impregated, or such added agents may be added to the surface or material prior to, during, or after the addition of the said resinous material.

I have found, however, that the application of resinous materials of the type described herein to surfaces and materials in general, and to organic materials, such as textiles and other woven, felted, knitted, or formed articles, in particular, is limited to some extent by the development of a definite and characteristic sweet, flowery odor by such resinous material after application. The odor usually does not manifest itself immediately, but becomes apparent after storage periods ranging from one day to several weeks, or even longer.

As a result of extensive experimentation, I have found that this odor results from the superficial oxidation and/or decomposition of the resinous material, which may be catalyzed by the presence of certain other agents present on the material being coated, or contained in the resinous polymer solution, or emulsion prior to application, or both, or otherwise.

In the case of textiles and finished articles formed therefrom, this may be an undesirable phenomena as the average person will not tolerate the development of any odor, however pleasant, in textiles or fabrics.

I have discovered that the formation of this odor can be eliminated, or its rate of formation greatly retarded, by the incorporation of an antioxidant and/or inhibitor in the resinous material of the type described herein prior to, during, or after the application of the said resinous material to the material to be coated and/or impregnated. For convenience of reference, these materials will be referred to herein as inhibitors.

While a number of such agents may be employed with varying degrees of success, I have discovered that excellent results are obtained when one or more agents selected from a list comprising (1) secondary amines containing one or more aryl or substituted aryl groups, (2) the reaction product of a ketone, such as acetone, and an aromatic amine, and (3) substituted and/or modified phenolic materials are added to the resin described.

Compounds of the first type may be represented by the following general formula

in which $R_1$ is a substituted or unsubstituted aryl, aralkyl, cycloparaffinic, cycloolefinic, hydroaromatic, or naphthenic ring or group, and in which R is a substituted or an unsubstituted aryl, arylalkyl, alkyl-aryl, alkyl, cycloparaffinic, cycloolefinic, hydroaromatic, or naphthenic ring or group, or the group

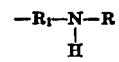

when R and $R_1$ have the same meaning as before.

Examples of secondary aryl amines which are particularly satisfactory when used as stabilizing agents for resins of the type described herein are Diphenyl-p-phenylene diamine

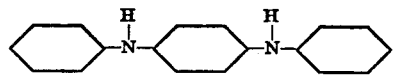

Phenyl beta naphthylamine

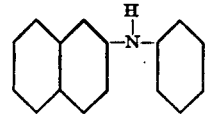

Isopropoxydiphenylamine

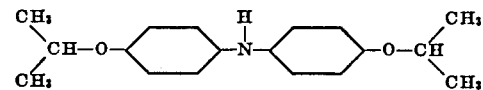

Aldol alpha naphthylamine (and polymers thereof)

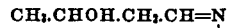

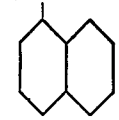

Symmetrical dibeta naphthyl-para-phenylenediamine

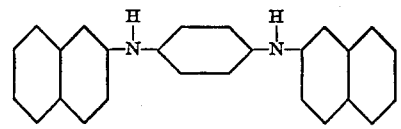

Trimethyl dihydroquinoline (and polymers thereof)

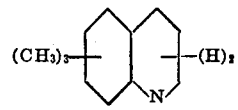

The ditolylamines

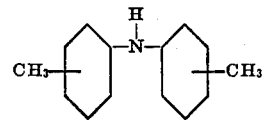

For the sake of convenience in the specification and claims, these compounds will be referred to as secondary aryl amines.

Mixtures of certain of these secondary aryl amines also are excellent inhibiting agents for this purpose. Included among the mixtures which have been found particularly desirable are a mixture of isopropoxydiphenyl amine and diphenyl-p-phenylene diamine, a mixture of phenyl beta naphthylamine, isopropoxydiphenylamine, and diphenyl-p-phenylene-diamine, and a mixture of phenyl beta naphthylamine and diphenyl-p-phenylenediamine.

Compounds of the second type may be prepared by the reaction of a ketone, such as acetone, with an aryl amine, such as aniline, p-amino diphenyl, and diphenyl p-phenylene diamine.

Compounds of the third type may be represented by the general formula

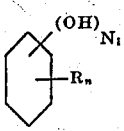

in which R may be hydrogen or an alkyl, aryl, aralkyl, alkyl-aryl, substituted alkyl, substituted aryl, substituted aralkyl, substituted alkyl-aryl, hydroxyl, amine, $SO_3H$, $SO_3Na$, $SO_3NH_2$, COOH, and COOA, where A is alkyl or aryl, and where $n$ and $N_1$ denotes that from 1 to 5 substituents may be attached to the ring. An example of a compound of this class is an alkylated polyhydroxy phenol.

Mixtures of two or more of the foregoing types of compounds also may be employed, if desired.

Although any desired quantity of inhibitor may be added to resins of the type described herein, I have found that the addition of from 0.1% to 10.0% by weight, based on the weight of resin present, is sufficient to stabilize the resin for a satisfactory period of time. From 0.5% to 5.0% will be found to be satisfactory for most purposes.

The inhibitor may be added to the resinous material in any desired manner. Thus, it may be mixed with the powdered or molten resin, or added in the form of a solution in a solvent and/or a plasticizing agent, after which the solvent and/or plasticizing agent may be removed, if desired. Other methods may, of course, be employed if desired.

The invention may be further illustrated by means of the following examples.

Example 1

An isoprene fraction obtained by the fractionation of light oil from oil gas, and containing 70% isoprene, 28% amylenes, and 2% pentanes, was mixed with toluene and polymerized with gaseous boron trifluoride at a temperature of —20° C. After neutralizing and removing the catalyst, a resin having an ASTM Ball and Ring softening point of 70° C. was obtained.

A portion of this resin was emulsified, using sodium oleate as the emulsifying agent. Approximately 5% by weight of Flectol H, an inhibitor prepared by the condensation of acetone and aniline, was added to the molten resin during the emulsifying procedure.

Upon applying a portion of the resin emulsion to a strip of cloth and removing the volatile material, a satisfactory coating was obtained which was extremely resistant to the development of any odor.

Example 2

This was a repetition of Example 1, with the exception that the resin employed was obtained by the polymerization of a light oil piperylene fraction, and phenyl-β-naphthylamine was used as the inhibitor.

The resinous coating did not develop any odor even after prolonged exposure to the air.

Example 3

This was a repetition of Example 1, with the exception that the resin employed was obtained by the polymerization of a light oil fraction containing both isoprene and piperylene, and an alkylated polyhydroxy phenol was used as the inhibitor.

A stable, non-odorous resinous coating was obtained.

Example 4

This was a repetition of Example 1, with the exception that a blend of diphenyl-p-phenylene diamine and the reaction product of acetone and p-amino diphenyl was employed as the inhibitor.

A stable coating highly resistant to oxidation was obtained upon applying this material to a woven fabric.

Example 5

This was a repetition of Example 1, with the exception that a mixture of phenyl-beta-naphthylamine and diphenyl-p-phenylenediamine was employed as the inhibitor.

Reference is made to my copending applications Serial Numbers 352,119, filed August 10, 1940, now Patent No. 2,394,266; 379,707, filed February 19, 1941, now Patent No. 2,374,242; and 450,082, filed July 7, 1942, now abandoned, wherein the preparation of resins of the character employed in these examples are described and claimed.

A coating highly resistant to the development of odor was obtained.

While the invention has been described in considerable detail with respect to the use of certain non-cyclic diolefine resinous polymers and one or more inhibitors for coating and/or impregnating cloth, it is to be understood that such compositions also may be used for other purposes for which the stable properties of such resinous mixture make the compositions particularly applicable, such as the use of such compositions for impregnating and/or coating organic and inorganic fibers, fabrics, and finished articles in general, for the preparation of adhesives, cements, and joining compositions, for the preparation of coating compositions for a large variety of applications, and for the preparation of plastic masses in general.

The recitation in the claims that the polymer is compatible with drying oils is made to characterize the polymer as distinguished from a rubber, and is not intended to imply either the presence or absence of a drying oil or oils.

It is to be understood, also, that the above specific examples are by way of illustration. Therefore, changes, omissions, additions, substitutions, and/or modifications may be made within the scope of the claims without departing from the spirit of the invention.

I claim:

1. As a new composition of matter, the resinous polymer obtained by the polymerization in the presence of an acid-acting metallic halide catalyst of a light oil fraction free from more than 5% cyclopentadiene by weight and containing 50–80% diolefines, 20–48% amylenes, and 2–5% pentanes, and from 0.1–10% of a stabilizing agent consisting of the products of reaction of acetone with an aryl amine selected from the group consisting of aniline, p-amino diphenyl and diphenyl-p-phenylene diamine, said composition being free from objectionable odor due to oxidation of the resinous polymer.

2. As a new composition of matter, the resinous polymer obtained by the polymerization in the presence of an acid-acting metallic halide catalyst of an isoprene fraction obtained by the fractionation of light oil from oil gas and containing approximately 70% isoprene, 28% amylenes and 2% pentanes, and from 0.1–10% of a stabilizing agent consisting of the products of reaction of acetone with an aryl amine selected from the group consisting of aniline, p-amino diphenyl and diphenyl-p-phenylene diamine, said composition being free from objectionable odor due to oxidation of the resinous polymer.

FRANK J. SODAY.

REFERENCES CITED

The following references are of record in the file of this patent:

UNITED STATES PATENTS

| Number | Name | Date |
|---|---|---|
| 1,901,044 | Schmidt | Mar. 14, 1933 |
| 2,270,959 | Murke | Jan. 27, 1942 |
| 1,947,626 | Thomas | Feb. 20, 1934 |
| 2,023,495 | Thomas | Dec. 10, 1935 |
| 2,268,418 | Paul | Dec. 30, 1941 |
| 1,924,979 | Calcott | Aug. 29, 1933 |
| 2,160,172 | Rosen | May 30, 1939 |

FOREIGN PATENTS

| Number | Country | Date |
|---|---|---|
| 329,969 | Great Britain | May 27, 1930 |
| 512,479 | Great Britain | Sept. 18, 1939 |